United States Patent Office 3,436,732
Patented Apr. 1, 1969

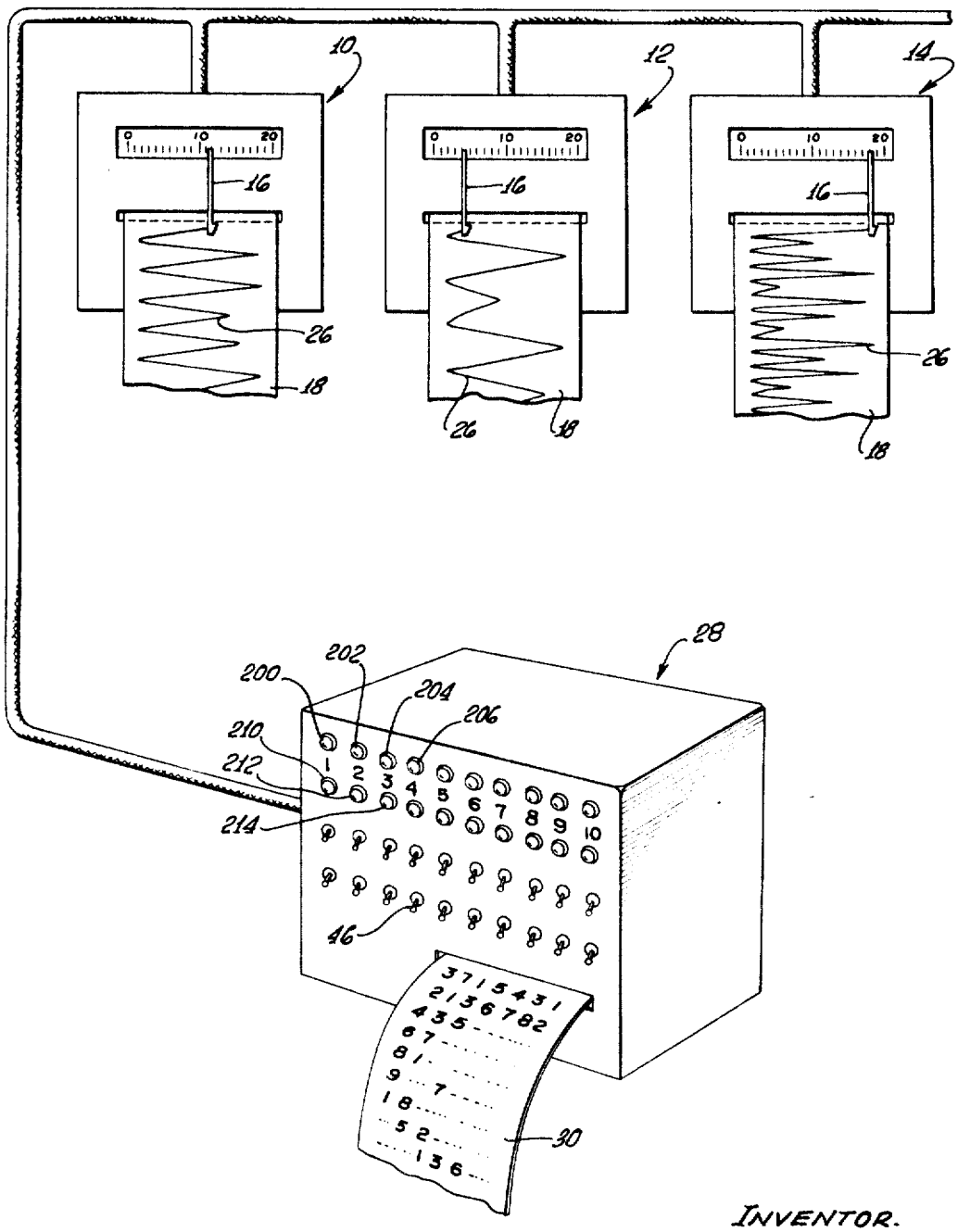

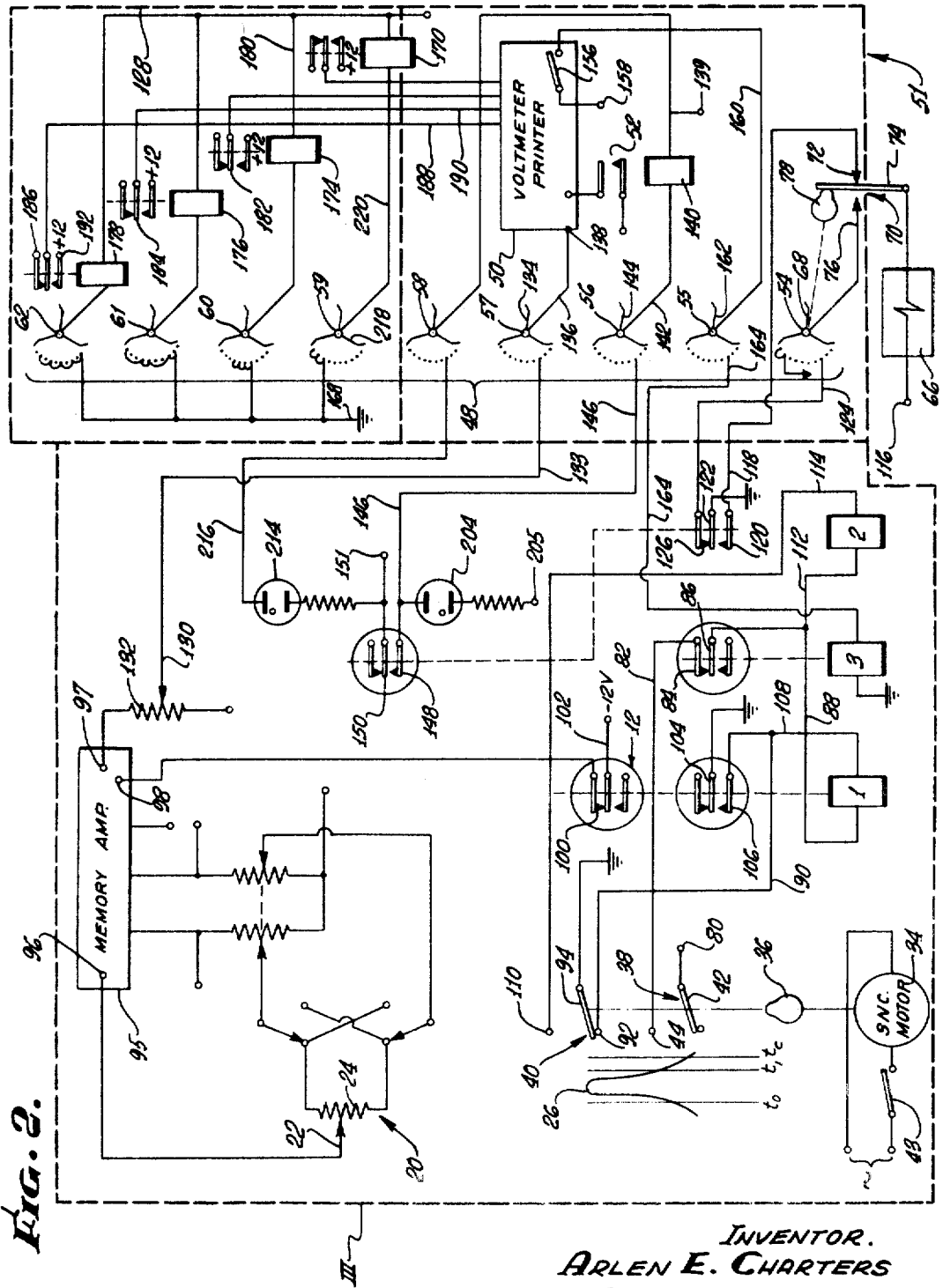

3,436,732
MULTIPLE SOURCE DATA COLLECTION SYSTEM
Arlen E. Charters, Santa Monica, Calif., assignor to Bio-Science Laboratories, Van Nuys, Calif., a corporation of California
Filed May 23, 1966, Ser. No. 552,100
Int. Cl. G11b 13/00
U.S. Cl. 340—172.5                21 Claims

ABSTRACT OF THE DISCLOSURE

A single digital recorder cooperates with a series of separate analytical devices, each of which produces an output to be recorded. Each device has a control circuit including means storing the output produced by the corresponding device. Each control circuit signals desired use of the recorder. Logic circuits cause the stored outputs to be accepted by the recorder in accordance with its operating characteristics.

BRIEF SUMMARY OF THE INVENTION

This invention relates to laboratory equipment, and more particularly to digital recording apparatus.

In a large laboratory, a large number of automated analytical processes may be simultaneously conducted, each requiring the use of digital recording apparatus. Yet to provide a digital recorder for each process involves a substantial investment. Accordingly, the primary object of this invention is to provide a single digital recording apparatus for a number of laboratory processes. This is made possible since the significant information produced by various processes, and intended to be recorded, occurs only periodically. If the periodicity of two or more processes is the same, the required readout times can be staggered. If the periodicities of the processes suitably vary, the required readout times need never coincide.

Another object of this invention is to provide a digital recording apparatus of this type incorporating simple modular circuitry for producing a tape each line of which contains the address of the module and the digital information corresponding to the output of the various processes.

Another object of this invention is to provide apparatus of this character that contains suitable displays whereby the technician can monitor the operation and make necessary adjustments.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIGURE 1 is a diagrammatic view of apparatus incorporating the present invention; and FIG. 2 is a schematic diagram showing the operation of the recorder.

DETAILED DESCRIPTION

In FIG. 1 several strip chart recorders 10, 12 and 14 are illustrated that are representative of a larger number. Each strip chart recorder has a recording head as at 16 for producing a strip chart 18. The recorders may service various types of analytical equipment, such as chromatography apparatus, photometric analyzers, etc.

Coupled to the recording head 16 is a slide wire potentiometer 20 (FIG. 2). This potentiometer has a slider 22 cooperable with a resistor 24 across which a direct current potential is applied. Accordingly the voltage at the slider 22 provides an analog signal of the output of the apparatus. This laboratory apparatus may be clocked so as to produce chart peaks 26 (FIG. 1) and corresponding voltage peaks at the slider 22 at certain regular intervals. The apparatus cooperating with the other recorders may produce peaks at other periodic rates. The significant information is the value of the chart or voltage peaks.

A digital readout device 28 (FIG. 1) is designed to produce a tape record 30 on which the peak values of all of the analytical apparatus is printed. Since the clock rates of the laboratory apparatus differ, the operating time of the digital readout device 28 may be shared by the recorders 10, 12 and 14.

The digital recorder 28 includes operating modules for each of the strip chart recorders 10, 12 and 14 and associated apparatus in order to control the operation of the digital printer. One such module III is shown in FIG. 2 for the third set of laboratory equipment. For purposes of convenience the potentiometer 20 is illustrated as part of the module. However, the potentiometer 20 will normally be incorporated in the corresponding strip chart recorder 10. All of the other parts illustrated in the module 32 may be packaged in the digital readout device 28.

The module III incorporates a synchronous motor 34 that, through a cam 36, cyclically operates a pair of snap switches 38 and 40 in synchronism with the peaks produced by the corresponding apparatus, as for example, once every 50 seconds. The motor 34 may be brought in step by an on/off switch 43 in the energization circuit of the synchronous motor 34. The switches 38 and 40 are shown in their normal positions. An arm 42 of switch 38 is moved to engage a contact 44 at a time $t_0$ just prior to the peak, and as indicated on the graph adjacent to the switches 38 and 40. When the contact 44 is engaged, a logic sequence results, the end product of which is the application of the voltage produced by the slider 22 of module III to the input of digital voltmeter-printer 50, and the printing of the registered data along with the address of the module.

The voltmeter-printer 50 is incorporated in a scanner 51. A stepper switch 52 in the scanner responds to the call of the module in question to feed the data from its slider 22 to the voltmeter-printer 50.

The stepper switch 48 incorporates a number of switch banks 54, 55, 56, 57, 58, 59, 60, 61 and 62. A motor 66 causes all of the arms of the switches to rotate in a clockwise direction through ten contacting positions corresponding to ten module addresses. One of the switch banks 54 controls the position of the stepper switch and responds to the call initiated by switch 38. Its arm 68 is connected to an interrupter switch 70. This interrupter switch has a contact 72 that is engaged by an arm 74 when the stepper switch is in a normal off position as shown. When the stepper switch is in any contacting position, the arm 74 is operated by a cam 78 coupled to the rotary switch arm 68.

As soon as the switch contact 44 is engaged, a circuit is completed to a start relay 1. Thus the circuit for relay 1 may be traced as follows: from a terminal 80 of a power supply, switch arm 42, contact 44, lead 82, back contact 84 and arm 86 controlled by reset relay 3 (to be later described), lead 88 to the relay 1, lead 90 to back contact 92, and switch arm 94 of the switch 40 to a ground terminal. A memory amplifier 95 is now conditioned to receive the signal from the potentiometer slider 22.

The memory amplifier is of a type that holds a maximum reading, and is a standard item such as manufactured by Micro-Instruments of Gardena, Calif. It has, in addition to power terminals, an input terminal 96 connected to slider 22, an output terminal 97 and a reset terminal 98. Reset terminal 98, when connected to a suitable negative voltage, maintains the output terminal 97 at 0 volts. When the reset voltage is removed, the amplifier operates. A reset voltage is normally applied through back contact 100 and a switch arm 102 controlled by the relay 1, but is removed when relay 1 operates.

Relay 1 has a holding circuit paralleling the back contacts 92 and arm 94 of the switch 40. Thus a grounded arm 104 of the relay 1 moves to engage a front contact 106 which, by the aid of lead 108, connects to the lead 90 and contact 92.

At time $t_1$ after the peak 26 has been passed, the cam 36 moves the switch arm 94 to engage the contact 110. This causes energization of relay 2 and operation of the stepper switch motor 66. Thus the energization for relay 2 may now be traced as follows: arm 42 which is connected to supply terminal 80, contact 44, lead 82, back contact 84, arm 86, the lead 112, relay 2, lead 114, contact 110, and grounded arm 94. Relay 2 completes an energization for the stepper switch motor 66 as follows: supply terminal 116, stepper switch motor 66, arm 74, off contact 72, lead 118, front contact 120 of relay 2, grounded contact 122. As the stepper switch moves, this energization circuit is interrupted and an alternate energization circuit is established through the switch arm 68 of the stepper switch bank 54 and back contacts of relays corresponding to relay 2 of modules I and II (not shown). Thus the circuit is established from the terminal 116, motor 66, arm 74, off normal contact 76, arm 68 to lead at contact position 1 corresponding to the lead 124, a back contact corresponding to contact 122. If the devices cooperable with module I and II are not on call, the motor 66 will continue to operate until it finds a module in which relay 2 has been operated, whereupon this energization circuit will be interrupted. Thus the stepper switch stops at the third contacting position, and is on station.

In a manner to be described hereinafter, a counter 128 operates registers of the printer so that the printer prints out the address of the module.

The input circuit for the digital voltmeter-printer 50 is now established as follows: the output terminal 97 of the memory amplifier 95, a slider 130 cooperable with a scaling resistor 132, a lead 133, third contact of stepper switch bank 57, arm 134, lead 136 to the input terminal 138. The command for operating the printer is transmitted by the aid of a time delay relay 140 incorporated in the scanner 51. The relay 140 has an energization circuit that may be traced as follows: power terminal 139, relay 140, lead 142, arm 144 of the stepper switch bank 56, a third contact thereof, lead 146, front contact 148 operated by relay 2, contact 150 to the opposite power terminal 151. The delay action of the relay 140 allows for proper contact closure before a print command is initiated.

As the printing takes place, a signal is applied to reset the memory amplifier 95 and the relays 1 and 2. This is achieved through the stepper switch bank 55. The printer incorporates a switch 156 that momentarily closes upon printing. This switch completes a circuit to energize a reset relay 3 incorporated in module III. The circuit may be traced as follows: supply contact 158, switch 156, lead 160, switch arm 162 of the stepper switch bank 55, the third contact thereof, the lead 164, relay 3 to a ground terminal. Contacts 84 and 86 are now broken, and accordingly, relay 1 and relay 2, both dependent thereon, drop out. This immediately closes contacts 126 and 122, completing a circuit to stepper switch motor 66, thus immediately to allow the stepper switch to answer other calls or return to the normal off position shown. All this takes place before time $t_c$ when the switches 38 and 40 return to normal position.

Only eight positions of the stepper switch are used, the ninth and tenth contacts of bank 54 being grounded so that the stepper switch motor 66 operates until the the neutral position is reached. In practice, the first contact position may serve as the neutral position.

The counter 128 has four binary digits to accommodate the ten positions of the stepper switch 52. Switch bank 62 provides the first binary digit by having its first, third, fifth, seventh and ninth contacts connected together and to a ground connection 168. The second bank 61 provides the second binary digit by having its second, third, sixth, seventh and tenth contacts connected to the ground contact 168. The switch bank 60 provides the third binary digit by having its fourth, fifth, sixth and seventh contacts connected together and to ground contact 168. The bank 59 provides the fourth binary digit by having its eighth, ninth and tenth contacts connected together and to the ground contact 168. The switch banks 59, 60, 61 and 62 operate relays 170, 174, 176 and 178 which in turn control contacts 180, 182, 184 and 186. When the rotary switch is in the third position, for example, circuits will be completed to the 1's unit and 2's unit relays 178 and 176 (to denote 3), and signals will be applied to leads 188 and 190 to appropriate printer registers. Thus the relay 178 connects the register lead 188 to a terminal 192 connected to a suitable supply. Similarly, the lead 190 has a circuit completed by the relay 176. The other relays 170 and 174, in this instance, are not operated. The four relays operate in binary fashion according to the position of the stepper switch.

A bank of neon or other suitable displays or lamps 200, 202, 204, 206, etc., mounted on the digital readout device 28 (FIG. 1), indicate which modules and strip chart recorder are on call. The lamp 204 is shown in FIG. 2. It has an energization circuit completed by relay 2, supply terminal 151, contact 150, and contact 148 to the lamp 204 and the opposite power terminal 205.

A series of similar neon or other suitable displays or lamps 210, 212, 214, etc., mounted on the digital readout device 28 (FIG. 1), indicate that the stepper switch is on station. For this purpose, the lamp 214 (FIG. 2) corresponding to module III has an energization circuit completed through the stepper switch bank 58. The circuit may be traced through power terminal 151, lamp 214, lead 216, third contact of the switch bank 58, arm 218 of the stepper switch, lead 220 to the opposite power terminal 139. By inspecting the lamps on the digital readout device 28, the technician can verify that all demands of the various modules and strip chart recorders are satisfied.

The inventor claims:

1. A digital recorder cooperable with a series of separate analytical devices each periodically producing an output to be recorded: a recorder; a corresponding series of control circuits for each of the devices; each of the circuits including store means for storing the output produced by the corresponding device; each of the circuits including switch means clocked with the corresponding device for signalling a desired use of the recorder and for corresponding signalling that use of the recorder is not required; means operable by the switch means for conditioning the store means to store the output; register control means operative to connect the store means of a selected control circuit to the recorder; means operated by said clocked switch means for operating the register control means to connect the store means of the corresponding control circuit to the recorder; reset means operable on completion of recording for clearing the corresponding store means and means operative upon completion of recording by said recorder for conditioning said register control means for operation by other circuit means.

2. A digital recorder cooperable with a series of separate analytical devices each periodically producing an output to be recorded: a printer; a corresponding series of control circuits for each of the devices; each of the circuits including store means for storing the output produced by the corresponding device; each of the circuits including switch means synchronized with the corresponding device for calling the printer; means operable by the switch means for conditioning the store means to store the output; register control means operative to connect the store means of a selected control circuit to the printer; means operated by said synchronized switch means for causing said register control means to answer said call; means operable when the register control means has answered a call for operating said printer; and means operative upon printing for disabling the call means and for clearing the corresponding store means.

3. A digital recorder cooperable with a series of separate analytical devices each periodically producing an output in the form of peak values to be recorded: a printer; a corresponding series of control circuits for each of the devices; each of the circuits including store means for storing the peak value produced by the corresponding device; register control means operative to connect the store means of a selected control circuit to the printer; each of the circuits including switch means synchronized with the corresponding device for calling the register control means; means operated by said synchronized switch means for causing said register control means to answer said call; means operable when the register control means has answered a call for operating said printer; means operative upon printing for disabling the call means; reset means operable on printing for clearing the corresponding store means; and switch means synchronized with the corresponding devices for resetting said call means.

4. A digital recorder cooperable with a series of separate analytical devices each periodically producing an output to be recorded: a printer; a stepper switch having a series of contacting positions corresponding respectively to the series of devices; a control circuit for each of the analytical devices; switch means sychronized with the correspoding devices for calling the stepper switch to the corresponding position; display means for each of the control circuits for indicating that the stepper switch is called; means operable by the switch means when the stepper switch reaches the called position for transmitting data to the printer and for operating the printer; means coupled to the stepper switch for transmitting data to the printer corresponding to the stepper switch position; and means operable following printing for cancelling the call and conditioning the stepper switch for answering other calls.

5. The apparatus as set forth in claim 4 together with display means for indicating the stepper switch position.

6. In a multiple source data collection system cooperable with a series of separate analytical devices each periodically producing an output in the form of peak values to be recorded: a printer having a register for data and an operating circuit; a series of control circuits for the analytical devices respectively; each of the control circuits having resettable store means for peak value of data produced by the corresponding analytical devices; register control means for operatively connecting the store means of any one of the control circuits to the printer register; each control circuit including:
  switch means clocked with the production of peaks by the corresponding analytical device;
  means operable by the switch means for conditionnig the store means to store the value of the corresponding peak;
  means for calling the register control means;
  means for transmitting through the register control means the data of the store means; and
  reset means operated by said clocked switch means for clearing the corresponding store means;
time delay means for completing the operation circuit of said printer; means operable upon completion of the print cycle for disabling the calling means of the corresponding control circuit to free the register control means in advance of the operation of the corresponding reset means.

7. The combination as set forth in claim 6 in which said printer has a second register for the address of the corresponding control circuit; and means operatively associated with said register control means for operating said second register.

8. The combination as set forth in claim 6 together with display means coupled to the register control means to indicate the operative position of the said register control means.

9. The combination as set forth in claim 6 together with display means operatively associated with said calling means to indicate which control circuit is calling the register control means.

10. The combination as set forth in claim 7 together with display means coupled to the register control means to indicate the operative position of the said register control means.

11. The combination as set forth in claim 7 together with display means operatively associated with said calling means to indicate which control circuit is calling the register control means.

12. The combination as set forth in claim 8 together with display means operatively associated with said calling means to indicate which control circuit is calling the register control means.

13. The combination as set forth in claim 10 together with display means operatively associated with said calling means to indicate which control circuit is calling the register control means.

14. In a multiple source data collection system cooperable with a series of separate analytical devices each periodically producing output in the form of peak values to be recorded: a digital voltmeter having an analog input and a digital output; a printer having a first register connected to the said digital output, an operating circuit and a print complete switch; a series of control circuits for the analytical devices respectively; each of the control circuits having means for storing the maximum value of an analog signal of the corresponding analytical device, and reset means for clearing the storing means; a stepper switch for operatively connecting the store means of any one of the control circuits to the analog input of the digital voltmeter, and having a motor, a first switch closed when the stepper switch is at a normal position and a second switch closed when the stepper switch is off normal position; each control circuit including:
  a pair of switches; synchronous means for switching one of said switches in advance of each peak produced by the corresponding analytical device and returning said one switch to its normal position after the corresponding peak has passed, said synchronous means switching the other of said switches after the corresponding peak, and for returning said other switch to its normal position thereafter; a first relay; a second relay; a third relay; an energization circuit for said first relay dependent upon said third relay being de-energized and upon operation of said one switch; means operated by said first relay for causing the storing means to store said analog signal; a holding circuit for said first relay shunting said first switch but dependent upon said third relay being de-energized; an energization circuit for the second relay dependent upon said third relay being de-energized and upon operation of said other switch;
a first energization circuit for said stepper switch motor including said first switch of said stepper switch and parallel branches each dependent upon the second relay of the successive control circuits being de-energized; a second energization circuit for said stepper switch motor including said second switch of said stepper switch and parallel branches each including successive contacts of the stepper switch and each dependent upon the second relay of the successive control circuits being de-energized; a time delay means initiated by the operating of the second relay when the stepper switch is on station for operating said printer; and an energization circuit for the third relay operated by said print complete switch when the stepper switch is on the corresponding station.

15. he combination as set forth in claim 14 in which said printer has a second register; and a counter coupled to said stepper switch for operating the second register for recording the address of the stepper switch station.

16. The combination as set forth in claim 14 in which each control circuit includes display means for indicating operation of its second relay.

17. The combination as set forth in claim 15 in which each control circuit includes display means for indicating operation of its second relay.

18. The combination as set forth in claim 14 together with a series of display means for indicating the position of the stepper switch.

19. The combination as set forth in claim 15 together with a series of display means for indicating the position of the stepper switch.

20. The combination as set forth in claim 16 together with a series of display means for indicating the position of the stepper switch.

21. The combination as set forth in claim 17 together with a series of display means for indicating the position of the stepper switch.

References Cited

UNITED STATES PATENTS

| | | | |
|---|---|---|---|
| 3,270,850 | 9/1966 | Smith et al. | 197—19 |
| 3,206,727 | 9/1965 | Picou | 340—15.5 |
| 3,200,194 | 8/1965 | Rabinow | 178—6 |
| 3,197,741 | 7/1965 | Kohler | 340—172.5 |
| 3,093,730 | 6/1963 | Propster | 235—151 |
| 3,056,111 | 9/1962 | Finkler et al. | 340—172.5 |
| 2,987,704 | 6/1961 | Gimpel et al. | 340—172.5 |
| 2,953,777 | 9/1960 | Gridley | 340—347 |
| 2,922,990 | 1/1960 | Anderson | 340—174 |
| 2,771,596 | 11/1956 | Bellamy | 340—177 |

GARETH D. SHAW, *Primary Examiner.*

U.S. Cl. X.R.

346—33